US 9,998,039 B2

(12) United States Patent
Ono

(10) Patent No.: US 9,998,039 B2
(45) Date of Patent: Jun. 12, 2018

(54) DRIVE CONTROL SYSTEM FOR VEHICLE

(71) Applicant: TOYOTA JIDOSHA KABUSHIKI KAISHA, Toyota-shi, Aichi-ken (JP)

(72) Inventor: Toshikazu Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/307,181

(22) PCT Filed: Apr. 27, 2015

(86) PCT No.: PCT/IB2015/000573
§ 371 (c)(1),
(2) Date: Oct. 27, 2016

(87) PCT Pub. No.: WO2015/166325
PCT Pub. Date: Nov. 5, 2015

(65) Prior Publication Data
US 2017/0117827 A1    Apr. 27, 2017

(30) Foreign Application Priority Data
Apr. 30, 2014    (JP) .................................. 2014-093907

(51) Int. Cl.
| H02P 1/54 | (2006.01) |
| H02P 5/46 | (2006.01) |
| B60L 7/14 | (2006.01) |
| H02P 3/18 | (2006.01) |
| H02P 27/06 | (2006.01) |

(Continued)

(52) U.S. Cl.
CPC .................. *H02P 5/46* (2013.01); *B60K 1/02* (2013.01); *B60L 7/14* (2013.01); *H02M 1/088* (2013.01); *H02M 3/158* (2013.01); *H02P 3/18* (2013.01); *H02P 27/06* (2013.01); *H02M 2001/0054* (2013.01)

(58) Field of Classification Search
CPC .............................. B60L 2210/10; H02P 5/74
See application file for complete search history.

(56) References Cited

U.S. PATENT DOCUMENTS

2010/0194318 A1    8/2010    Aso
2017/0144650 A1*   5/2017    Nagamiya ............. B60W 20/12

FOREIGN PATENT DOCUMENTS

| JP | 2010-283932 A | 12/2010 |
| JP | 2013-193523 A | 9/2013 |

* cited by examiner

*Primary Examiner* — Karen Masih
(74) *Attorney, Agent, or Firm* — Oliff PLC

(57) ABSTRACT

A drive control system includes a battery, a direct current/direct current converter, a first motor, a second motor, and a controller. The battery is a direct-current power supply. The direct current/direct current converter is connected to the battery. The first motor is connected to the direct current/direct current converter, and drives one of a front wheel and a rear wheel. The second motor is connected to the battery, and drives the other one of the front wheel and the rear wheel, which is different from the wheel that the first motor drives. The controller controls step-up operation of the direct current/direct current converter, and executes intermittent step-up control. When a required driving force of a vehicle changes during a stop of the direct current/direct current converter through the intermittent step-up control, the second motor outputs an amount of change in the required driving force.

7 Claims, 12 Drawing Sheets

(51) Int. Cl.
   *B60K 1/02* (2006.01)
   *H02M 3/158* (2006.01)
   *H02M 1/088* (2006.01)
   *H02M 1/00* (2006.01)

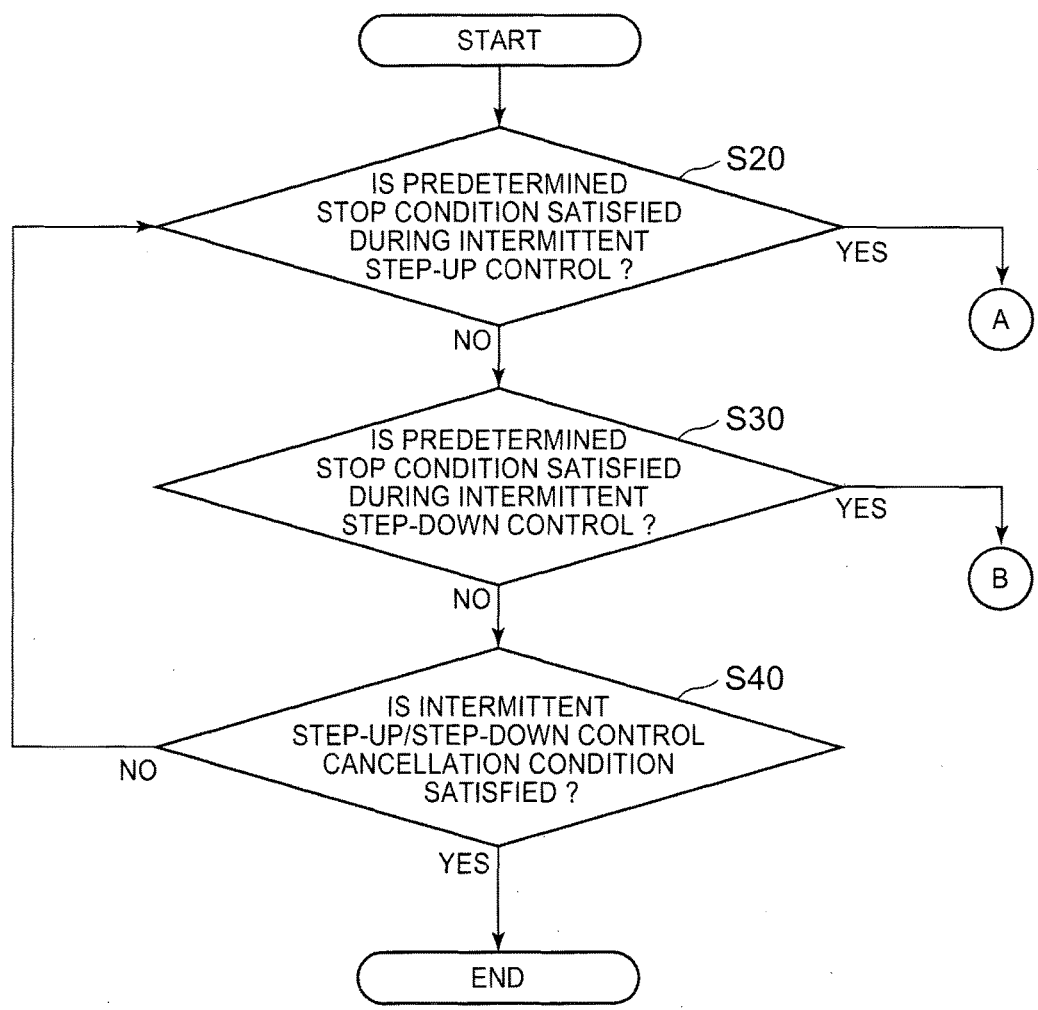

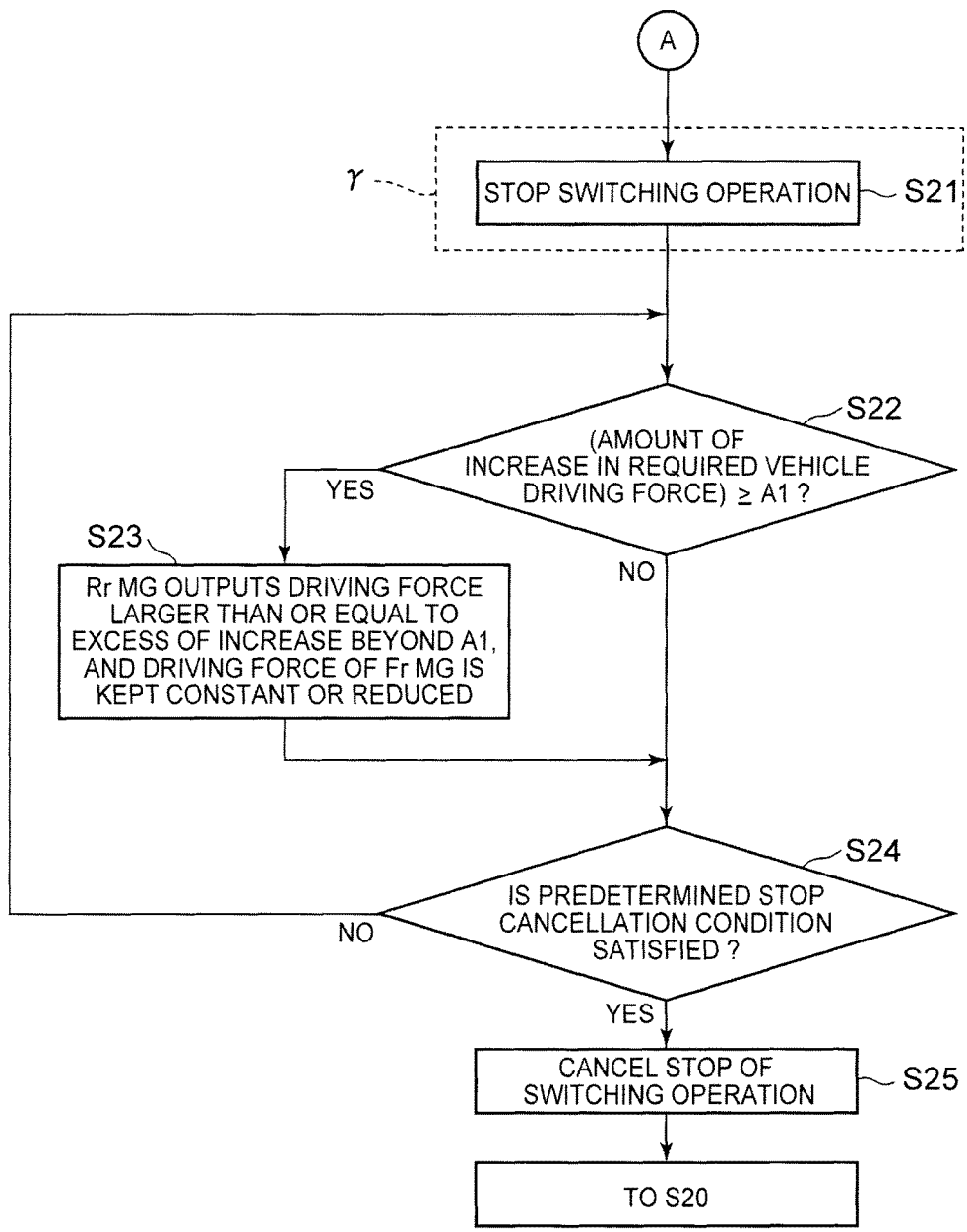

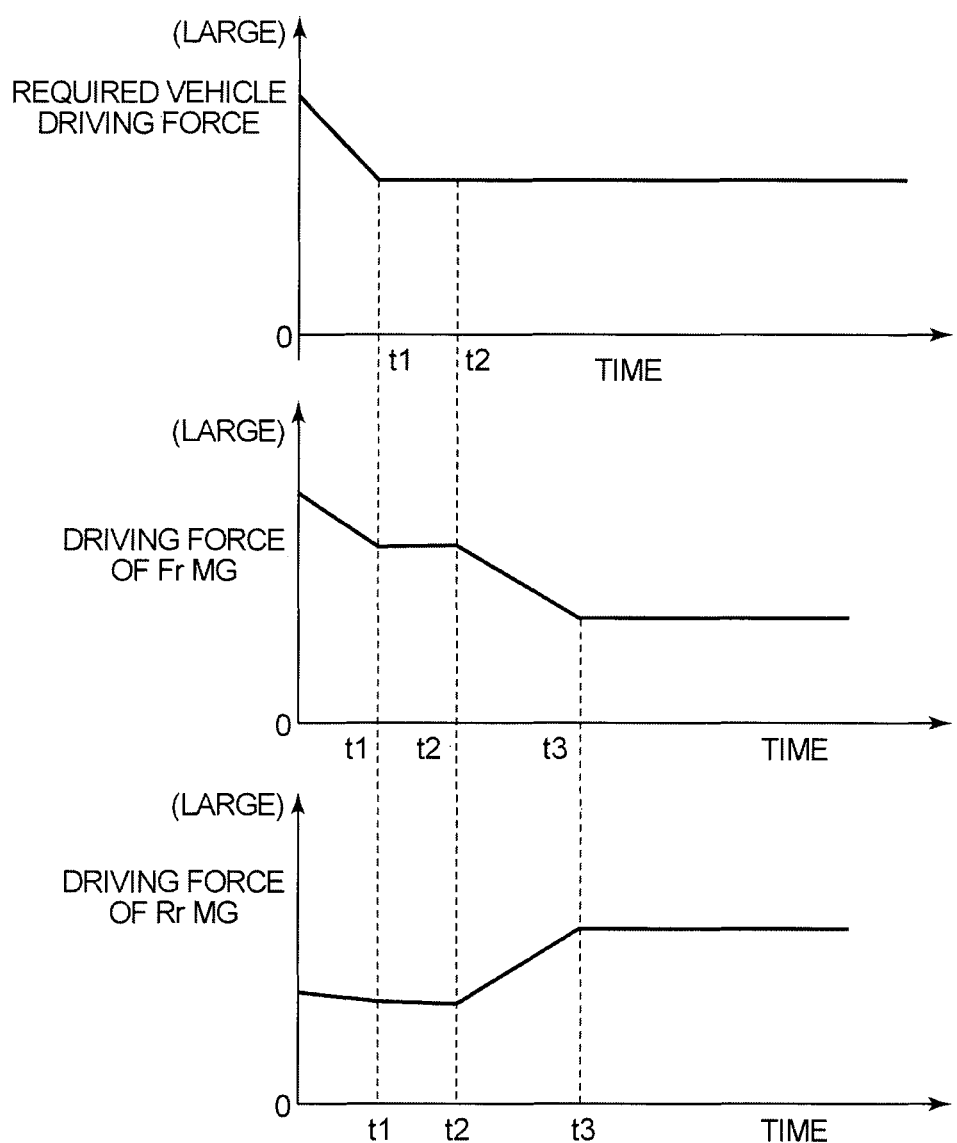

DRIVE CONTROL SYSTEM FOR VEHICLE

BACKGROUND OF THE INVENTION

1. Field of the Invention

The invention relates to a drive control system for a vehicle and, more particularly, to motor torque control in intermittent step-up control over a direct current/direct current converter.

2. Description of Related Art

There is known an electromotive vehicle, such as a hybrid vehicle, an electric vehicle and a fuel-cell vehicle. The hybrid vehicle is equipped with an electric motor and an engine, and travels by using at least one of the electric motor and the engine as a driving source. The electric vehicle is equipped with an electric motor as a driving source. The electromotive vehicle may transform the voltage of a direct-current power supply, such as a battery, with the use of a direct current/direct current converter, supply electric power having the transformed voltage to an inverter, convert the electric power to alternating-current power with the use of the inverter, and supply the electric power to an electric motor.

Japanese Patent Application Publication No. 2010-283932 (JP 2010-283932 A) describes a configuration including an electric motor and a control unit. The electric motor is connected to a direct-current power supply via a direct current/direct current converter and an inverter. The control unit stops the direct current/direct current converter in response to fulfillment of a predetermined stop condition.

Japanese Patent Application Publication No. 2013-193523 (JP 2013-193523 A) describes the following configuration. A hybrid vehicle includes a first motor and a second motor. The first motor drives one of a pair of front wheels and a pair of rear wheels. The second motor drives the other one of the pair of front wheels and the pair of rear wheels. The first motor is connected to a direct-current power supply via a direct current/direct current converter. The second motor is connected to the direct-current power supply without intervention of the direct current/direct current converter.

In an electromotive vehicle including a first motor and a second motor for driving wheels as in the case of the configuration described in JP 2013-193523 A, when a direct current/direct current converter is stopped by stopping the switching operation of the direct current/direct current converter in response to fulfillment of a predetermined stop condition, there is a possibility that a loss of the direct current/direct current converter is reduced if a stop time of the switching operation is extended. However, when a change in the driving force of the first motor increases as a result of a change in the required driving force of the vehicle increases during the stop time, a change in consumption energy increases, with the result that a transformed voltage may decrease in a short period of time and a deviation from a target voltage may increase. Thus, the stop of the direct current/direct current converter is cancelled in a short period of time.

In existing control, when the vehicle driving force is kept constant in a high state even when the vehicle driving force is kept constant during a stop time of the direct current/direct current converter, an electric power consumption on the first motor side with respect to the direct current/direct current converter increases, so there is a concern that the stop of the direct current/direct current converter is early cancelled. On the other hand, when a switching operation stop time is extended by merely limiting the driving torque of the first motor during the stop time of the direct current/direct current converter, there is a concern that the driving performance of the vehicle decreases. When taking into consideration this point, it is desired to achieve both a reduction in the loss of the direct current/direct current converter and suppression of a decrease in driving performance.

SUMMARY OF THE INVENTION

The invention provides a drive control system for a vehicle, which achieves both a reduction in the loss of a direct current/direct current converter and suppression of a decrease in driving performance.

An aspect of the invention provides a drive control system for a vehicle. The drive control system includes a direct-current power supply, a direct current/direct current converter, a first inverter, a second inverter, a first motor, a second motor, and a controller. The direct current/direct current converter is connected to the direct-current power supply. The direct current/direct current converter is configured to transform a voltage of the direct-current power supply. The first motor is connected to the direct-current power supply via the direct current/direct current converter and the first inverter. The first motor is configured to drive one of front and rear wheels of the vehicle. The second motor is connected to the direct-current power supply via the second inverter. The second motor is configured to drive the other one of the front and rear wheels, which is different from the wheel that the first motor drives. The controller is configured to control step-up operation of the direct current/direct current converter through switching control over the direct current/direct current converter. The controller is configured to execute intermittent step-up control for stopping the direct current/direct current converter in response to fulfillment of a predetermined stop condition during the step-up operation. The controller is configured to, when a required driving force of the vehicle changes during a stop of the direct current/direct current converter through the intermittent step-up control, cause the second motor to output the change in the required driving force.

In the drive control system, each of the first motor and the second motor may be configured to have a function of a generator. The direct current/direct current converter may be configured to step down a voltage on a side of the first inverter and then output an electric power having the stepped-down voltage to the direct-current power supply. The controller may be configured to control step-down operation of the direct current/direct current converter through switching control over the direct current/direct current converter. The controller may be configured to execute intermittent step-down control for stopping a switching operation of the direct current/direct current converter in response to fulfillment of the predetermined stop condition during the step-down operation. The controller may be configured to, when a required regenerative braking force of the vehicle changes during a stop of the direct current/direct current converter through the intermittent step-down control, execute control cause the second motor to output the change in the required regenerative braking force.

In the drive control system, when a change in the required diving force is larger than or equal to a first predetermined value or a change in the required regenerative braking force is larger than or equal to a second predetermined value during a stop of the direct current/direct current converter, the controller may be configured to cause the second motor to output an excess of the change in the required driving force beyond the first predetermined value or an excess of the change in the required regenerative braking force beyond the second predetermined value.

In the drive control system, when a change in the required diving force is larger than or equal to the first predetermined value or a change in the required regenerative braking force is larger than or equal to the second predetermined value during the stop of the direct current/direct current converter, the controller may be configured to cause the second motor to output an excess of the change in the required driving force beyond the first predetermined value or the excess of the change in the required regenerative braking force beyond the second predetermined value. The controller may be configured to cause to reduce a driving force or regenerative braking force of the first motor.

In the drive control system, the controller may be configured to set a distribution ratio of a driving force of the first motor so as to be smaller than a distribution ratio of a driving force of the second motor with respect to the required driving force during the stop of the direct current/direct current converter.

With the above-described drive control system for a vehicle according to the invention, it is possible to achieve both a reduction in the loss of the direct current/direct current converter and suppression of a decrease in driving performance. Specifically, with the drive control system according to the invention, when the required driving force changes during the stop of the direct current/direct current converter, the second motor outputs the change in the required driving force. Thus, it is possible to suppress a rapid change in the driving force of the first motor. Therefore, it is possible to extend the stop time of the direct current/direct current converter by suppressing a rapid increase in the difference between a voltage transformed by the direct current/direct current converter and a target voltage, so the loss of the direct current/direct current converter is reduced. It is possible to achieve the required driving force of the vehicle, so it is possible to suppress a decrease in driving performance.

Another aspect of the invention provides a drive control system for a vehicle. The drive control system includes a direct-current power supply, a direct current/direct current converter, a first inverter, a second inverter, a first motor, a second motor, and a controller. The direct current/direct current converter is connected to the direct-current power supply. The direct current/direct current converter is configured to transform a voltage of the direct-current power supply. The first motor is connected to the direct-current power supply via the direct current/direct current converter and the first inverter. The first motor is configured to drive one of front and rear wheels of the vehicle. The second motor is connected to the direct-current power supply via the second inverter. The second motor is configured to drive the other one of the front and rear wheels, which is different from the wheel that the first motor drives. The controller is configured to control step-up operation of the direct current/direct current converter through switching control over the direct current/direct current converter. The controller is configured to execute intermittent step-up control for stopping the direct current/direct current converter in response to fulfillment of a predetermined stop condition during the step-up operation. The controller is configured to, during a stop of the direct current/direct current converter through the intermittent step-up control, reduce a driving force of the first motor and increase a driving force of the second while a driving force of the vehicle is kept constant.

In the drive control system, each of the first motor and the second motor may be configured to have a function of a generator. The direct current/direct current converter may be configured to step down a voltage on a side of the first inverter and then output an electric power having the stepped-down voltage to the direct-current power supply. The controller may be configured to control step-down operation of the direct current/direct current converter through switching control over the direct current/direct current converter. The controller may be configured to execute intermittent step-down control for stopping a switching operation of the direct current/direct current converter in response to fulfillment of the predetermined stop condition during the step-down operation. The controller may be configured to, during a stop of the direct current/direct current converter through the intermittent step-down control, reduce a regenerative braking force of the first motor and increase a regenerative braking force of the second motor while a regenerative braking force of the vehicle is kept constant.

With the above-described drive control system for a vehicle, during a stop of the direct current/direct current converter, the driving force of the first motor is reduced and the driving force of the second motor is increased while the driving force of the vehicle is kept constant. Thus, it is possible to reduce the driving force of the first motor, so it is possible to extend the stop time of the direct current/direct current converter. Therefore, the loss of the direct current/direct current converter is reduced. A decrease in the driving force of the first motor is compensated by an increase in the driving force of the second motor, so it is possible to suppress a decrease in driving performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a view that shows a flowchart that is used in control over a first motor and a second motor during intermittent step-up/step-down control in the first embodiment of the invention;

FIG. 3B is a view that shows a flowchart that is used in a process at the time of shifting into a stop of switching operation resulting from intermittent step-up control in the flowchart shown in FIG. 3A;

FIG. 9 is a graph that shows one example of temporal changes in a required driving force of the vehicle, a driving force of the FrMG and a driving force of the RrMG during a stop of switching operation resulting from intermittent step-up control in the second embodiment of the invention.

DETAILED DESCRIPTION OF EMBODIMENTS

Figure 1:
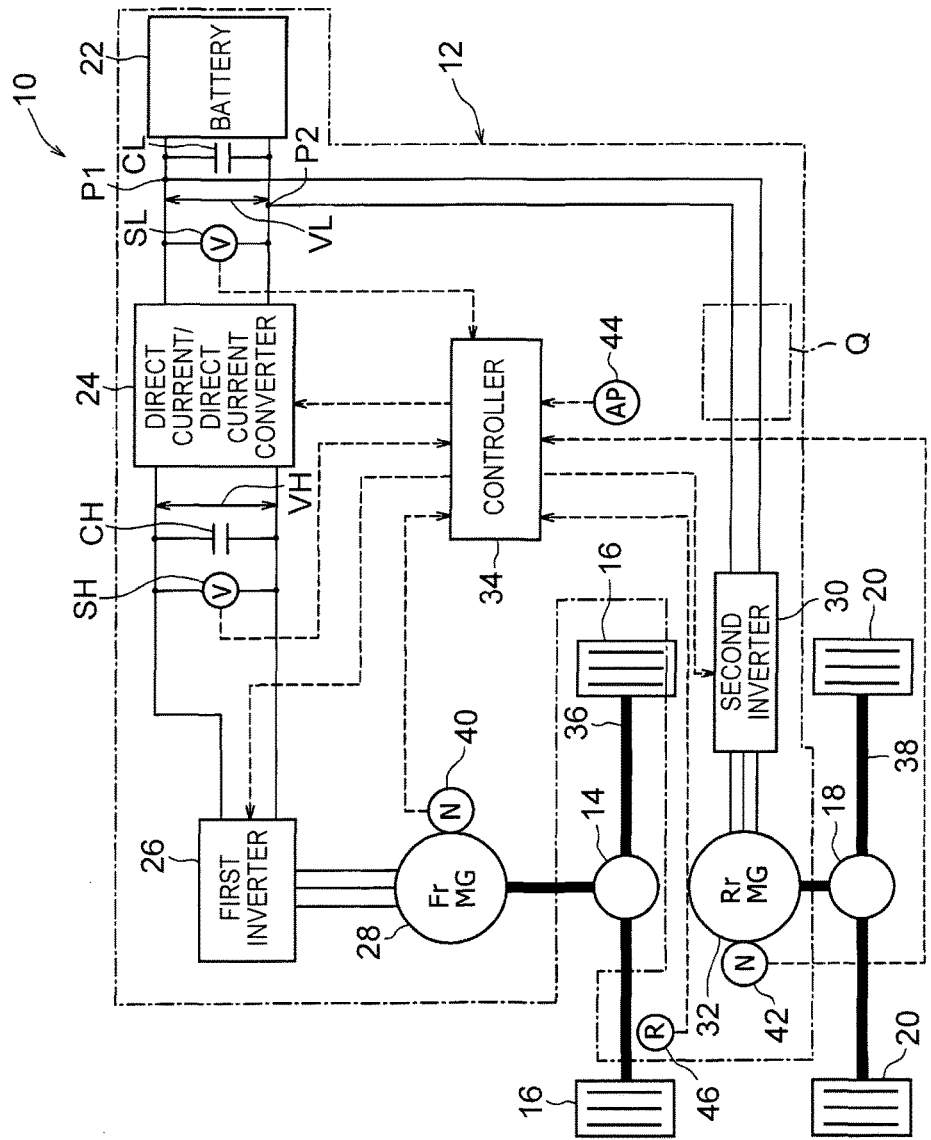
FIG. 1 is a view that shows the schematic configuration of an electromotive vehicle on which a drive control system according to a first embodiment of the invention is mounted.

Hereinafter, embodiments of the invention will be described in detail with reference to the accompanying drawings. Motor generators each having the function of an electric motor and the function of a generator will be described as a first motor and a second motor. Instead, the first motor and the second motor do not need to have the function of a generator. A direct current/direct current converter having a step-up/step-down function will be described. Instead, a direct current/direct current converter may be configured to merely have only the step-up function. A controller having the function of executing intermittent step-up/step-down control, that is, executing intermittent step-up control or intermittent step-down control while switching between the intermittent step-up control and the intermittent step-down control in response to fulfillment of a predetermined condition, will be described. Instead, the controller may be configured to have the function of executing only intermittent step-up control out of intermittent step-up control and intermittent step-down control. A direct current/direct current converter that steps up a battery voltage will be described. Instead, the direct current/direct current converter just needs to transform the battery voltage, and may step down the battery voltage. As a vehicle, basically, a pair of front wheels and a pair of rear wheels are respectively driven by single motor generators. Therefore, the vehicle will be described as an electromotive vehicle that is driven by using two motor generators. Instead, the vehicle may be a hybrid vehicle having an engine and a motor generator as driving sources. The vehicle may be an electric vehicle or a fuel-cell vehicle. Like reference numerals denote similar components to those of FIG. 1 and FIG. 2.

A first embodiment of the invention will be described. FIG. 1 shows the schematic configuration of an electromotive vehicle 10 on which a drive control system 12 according to the first embodiment is mounted. The electromotive vehicle 10 includes the drive control system 12, a front drive mechanism 14, front wheels 16, a rear drive mechanism 18, and rear wheels 20. The drive control system 12 includes a battery 22, a direct current/direct current converter 24, a first inverter 26, a first motor generator 28, a second inverter 30, a second motor generator 32, and a controller 34. The battery 22 is a direct-current power supply. The first motor generator 28 is a first motor. The second motor generator 32 is a second motor. Hereinafter, the first motor generator 28 is referred to as FrMG 28 because the first motor generator 28 drives the front wheels 16, and the second motor generator 32 is referred to as RrMG 32 because the second motor generator 32 drives the rear wheels 20.

The battery 22 is a secondary battery, such as a nickel-metal hydride battery and a lithium ion battery. Other than the battery 22, a capacitor may be used as the direct-current power supply.

The direct current/direct current converter 24 is connected to the battery 22, and steps up a battery voltage. A direct-current voltage stepped up by the direct current/direct current converter 24 is supplied to the first inverter 26. The FrMG 28 is connected to the first inverter 26. Thus, the FrMG 28 is connected to the battery 22 via the direct current/direct current converter 24 and the first inverter 26.

An output shaft of the FrMG 28 is coupled to the front wheels 16 via the front drive mechanism 14. The front wheels 16 are coupled to a front axle 36. The FrMG 28 is driven by using electric power that is supplied from the battery 22, with the result that the FrMG 28 drives the front wheels 16 via the front drive mechanism 14 and the front axle 36. The FrMG 28 also has the function of a generator for regenerating electric power when regenerative braking is carried out during deceleration of the vehicle. Electric power generated by the FrMG 28 is supplied to the battery 22 via the first inverter 26 and the direct current/direct current converter 24, with the result that the battery 22 is charged.

The second inverter 30 is connected to connection points P1, P2 between the battery 22 and the direct current/direct current converter 24, so the second inverter 30 is connected to the battery 22 without intervention of the direct current/direct current converter 24. The RrMG 32 is connected to the second inverter 30.

An output shaft of the RrMG 32 is coupled to the rear wheels 20 via the rear drive mechanism 18. The rear wheels 20 are coupled to a rear axle 38. The RrMG 32 is driven by using electric power that is supplied from the battery 22, with the result that the RrMG 32 drives the rear wheels 20, different from the front wheels 16 that are driven by the FrMG 28, via the rear drive mechanism 18 and the rear axle 38. The RrMG 32, as well as the FrMG 28, has the function of a generator for regenerating electric power. Electric power generated by the RrMG 32 is supplied to the battery 22 via the second inverter 30, with the result that the battery 22 is charged.

A first rotation sensor 40 is attached to the FrMG 28. The first rotation sensor 40 detects the rotation angle or rotation speed of the FrMG 28. A detected signal of the first rotation sensor 40 is transmitted to the controller 34. A second rotation sensor 42 is attached to the RrMG 32. The second rotation sensor 42 detects the rotation angle or rotation speed of the RrMG 32. A detected signal of the second rotation sensor 42 is transmitted to the controller 34. When the rotation angle is transmitted to the controller 34, the controller 34 calculates and acquires the rotation speed of the FrMG 28 or RrMG 32 from the transmitted rotation angle. In this case, a rotation speed acquisition unit of the controller 34 and the sensors 40, 42 that respectively detect the rotation angles constitute an MG rotation speed acquisition unit. The "rotation speed" also includes the meaning of the number of revolutions per minute.

Each of the FrMG 28 and the RrMG 32 may be a permanent magnet synchronous motor or an induction motor.

When the electromotive vehicle 10 is a hybrid vehicle, the front drive mechanism 14 or the rear drive mechanism 18 may include a power split mechanism that is configured to output at least part of the sum of power from the engine and power from the FrMG 28 (or the RrMG 32) to the front axle 36 (or the rear axle 38). The power split mechanism is formed of a planetary gear train. In FIG. 1, electric power transmission systems are indicated by the continuous lines, mechanical power transmission systems are indicated by the continuous lines wider than those of the electric power transmission systems, and signal transmission systems are indicated by the dashed lines.

An accelerator sensor 44 detects a depression amount of an accelerator pedal, and transmits a signal indicating the detected value to the controller 34. An axle sensor 46 detects the rotation speed of the front axle 36 or rear axle 38, and transmits a signal indicating the detected value to the controller 34. The controller 34 calculates a vehicle speed from the detected value of the axle sensor 46. The vehicle speed may be calculated by the controller 34 from the detected value of the first rotation sensor 40 or second rotation sensor 42 or an acquired value of the MG rotation speed acquisition unit.

Figure 2:
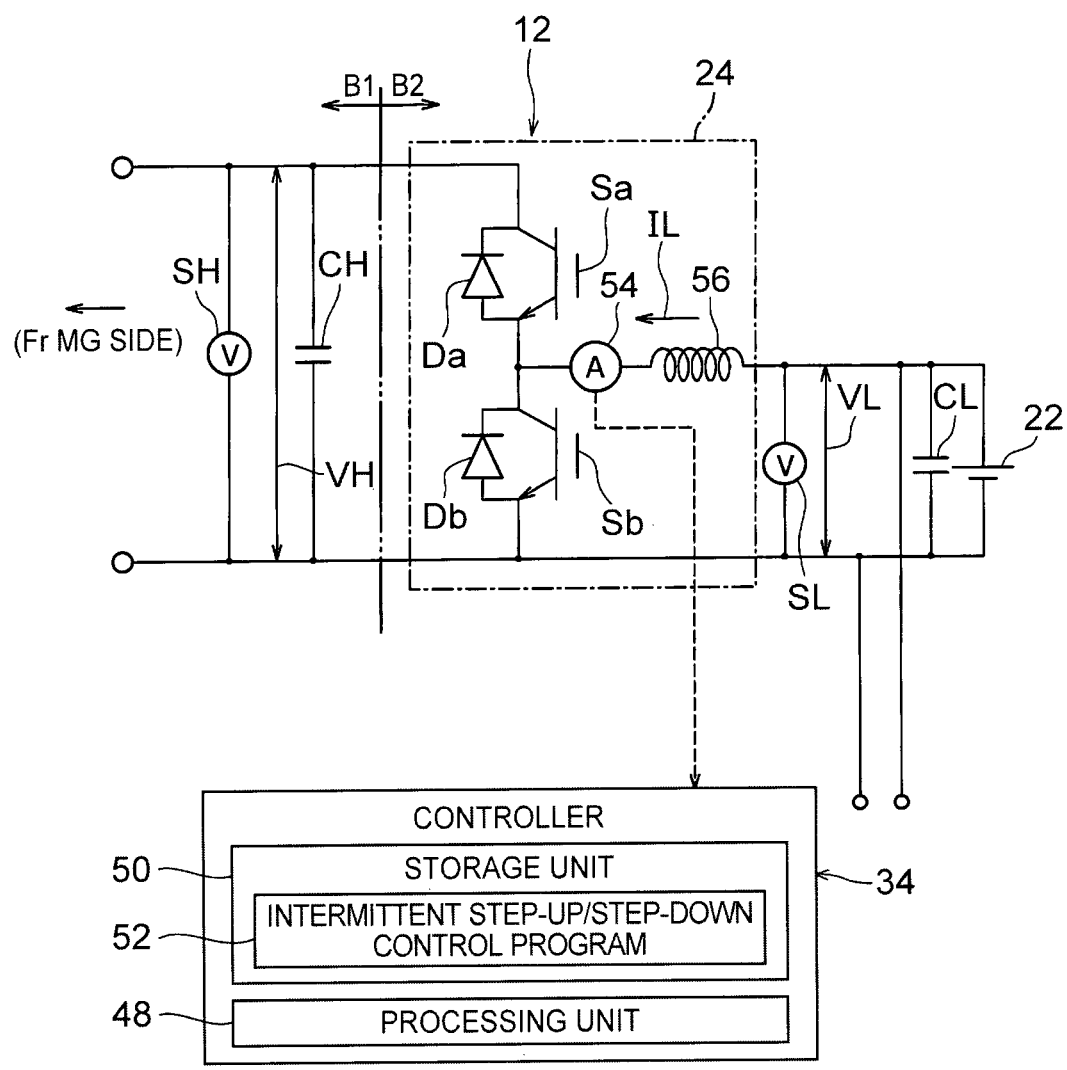
FIG. 2 is a circuit diagram that shows the details of a direct current/direct current converter shown in FIG. 1.

The controller 34 includes a microcomputer including a CPU and a memory. In the example shown in the drawing, only the single controller 34 is shown as the controller 34. Instead, the controller 34 may be split into a plurality of component elements as needed and the plurality of component elements may be connected to each other via a signal cable. As shown in FIG. 2 (described later), the controller 34 includes a processing unit 48 including the CPU and a storage unit 50 including the memory. Control data and control programs for the electromotive vehicle 10 are stored in the storage unit 50. The control programs include an intermittent step-up/step-down control program 52 that is executed in accordance with the flowcharts of FIG. 3A, FIG. 3B and FIG. 3C, or FIG. 7 in addition to FIG. 3A, FIG. 3B and FIG. 3C, or FIG. 8A and FIG. 8B in addition to FIG. 3A, FIG. 3B and FIG. 3C (these drawings will be described later). The intermittent step-up/step-down control program 52 is used in intermittent step-up/step-down control (described later).

The controller 34 calculates a required driving force of the vehicle on the basis of the depression amount of the accelerator pedal or both the vehicle speed and the depression amount of the accelerator pedal. The FrMG 28 and the RrMG 32 are controlled by the controller 34 so as to generate the required driving force in total during motor running. The "motor running" means that the vehicle travels by using one or both of the first motor and the second motor as the driving sources. The "motor running" means so-called EV traveling, that is, when the electromotive vehicle 10 is a hybrid vehicle including the engine, the first motor and the second motor as the driving sources of the vehicle, the engine is not caused to generate driving force, and one or both of the first motor and the second motor are used as the driving sources.

When the required driving force is generated in total by controlling the FrMG 28 and the RrMG 32, the controller 34 controls the first inverter 26, the second inverter 30 and the direct current/direct current converter 24. In this case, when the vehicle is driven to travel, the distribution ratio between the required driving force of the FrMG 28 and the required driving force of the RrMG 32 may be basically set in advance. The controller 34 may be configured to change the ratio of driving force distribution between the FrMG 28 and the RrMG 32 among a plurality of ratios set in advance in response to fulfillment of a predetermined condition set in advance. The driving force distribution between the FrMG 28 and the RrMG 32 may include the case where the driving force of one of the MGs 28, 32 is zero. When the driving force of one of the MGs 28, 32 is zero, the vehicle achieves two-wheel traveling in motor running. In the two-wheel traveling, the vehicle drives only the front wheels 16 or only the rear wheels 20.

The controller 34 controls the first inverter 26, the second inverter 30 and the direct current/direct current converter 24 so that the FrMG 28 and the RrMG 32 generate a required regenerative braking force when a predetermined regenerative condition is satisfied. The predetermined regenerative condition is, for example, the condition that the depression amount of the accelerator pedal becomes zero during traveling. The required regenerative braking force may be set as a value set in the storage unit 50 of the controller 34 in advance. The required regenerative braking force may be changed in response to a detected value of an SOC or the vehicle speed. The SOC is the state of charge of the battery 22. As in the case of distribution of the required driving force, the distribution ratio of the required regenerative braking force between the FrMG 28 and the RrMG 32 may also be set in advance or the distribution ratio of the required regenerative braking force may be changed in response to fulfillment of a predetermined condition.

The SOC is calculated from a detected value of a battery current sensor (not shown) that detects a charge/discharge current of the battery 22 or a detected value of a battery voltage sensor (not shown) that detects an output voltage of the battery.

A low-voltage-side capacitor CL and a low-voltage-side voltage sensor SL are provided on the output side of the battery 22. The low-voltage-side capacitor CL smoothes the output voltage of the battery 22. The low-voltage-side voltage sensor SL detects a low-voltage-side voltage VL that is the voltage of the low-voltage-side capacitor CL. A high-voltage-side capacitor CH and a high-voltage-side voltage sensor SH are provided on the VH side that is the output side of the direct current/direct current converter 24. The high-voltage-side capacitor CH smoothes a high-voltage-side voltage VH. The high-voltage-side voltage sensor SH detects the high-voltage-side voltage VH. Signals indicating the detected values of the voltage sensors SL, SH are transmitted to the controller 34. The low-voltage-side capacitor CL may be omitted.

FIG. 2 is a circuit diagram that shows the details of the direct current/direct current converter 24. The direct current/direct current converter 24 includes two switching elements Sa, Sb and a reactor 56. The two switching elements Sa, Sb are connected in series with each other. The reactor 56 is connected to an intermediate point IL of the switching elements Sa, Sb via an IL current sensor 54. Each of the switching elements Sa, Sb is a transistor, such as an IGBT. A diode Da is connected in parallel with the switching element Sa so as to pass current in a direction opposite to that of the switching element Sa. A diode Db is connected to the switching element Sb so as to pass current in a direction opposite to that of the switching element Sb. One end of the reactor 56 is connected to the positive electrode of the battery 22.

The IL current sensor 54 detects a current flowing through the reactor 56, and transmits a signal indicating the detected value to the controller 34. The IL current sensor 54 may be connected between one end of the reactor 56 and the battery 22. The detected value of the IL current sensor 54 may be used when it is determined whether to stop switching operation in intermittent step-up/step-down control (described later).

The controller 34 controls the operation of the direct current/direct current converter 24 by controlling the switching operation of the direct current/direct current converter 24. When drive control over the vehicle is executed, the controller 34 controls the operation of the direct current/direct current converter 24 by turning on or off the switching operation so that the detected value VH of the high-voltage-side voltage becomes a target voltage VH*. For example, a torque command value of the FrMG 28 is calculated from the required driving force of the FrMG 28 and the detected value or acquired value of the rotation speed of the FrMG 28, and the target voltage VH* of VH is calculated from the required driving force of the FrMG 28 on the basis of a correlation set in advance. When regenerative braking is carried out, a negative torque command value of the FrMG 28 is calculated from the correlation between the required regenerative braking force of the FrMG 28 and the rotation speed of the FrMG 28. The current target voltage VH* set at the time of power running is maintained at the time of regenerative braking.

When the FrMG 28 is driven or when the FrMG 28 is subjected to regenerative braking, the controller 34 executes feedback control so that the detected voltage VH becomes the target voltage VH*. Control for bringing a detected value of the IL current sensor 54 into coincidence with a target value may be combined with control for bringing the detected voltage VH close to the target voltage VH*. A current flowing through the reactor 56 may be calculated by using a detected value of a current sensor different from the IL current sensor 54.

Next, the intermittent step-up/step-down control will be described. The controller 34 starts executing the intermittent step-up/step-down control program 52 at predetermined timing or in response to fulfillment of a predetermined condition. When the execution of the intermittent step-up/step-down control program 52 has been started, the controller 34 executes the intermittent step-up/step-down control. In this case, the controller 34 stops the direct current/direct current converter 24 by stopping the switching operation of the direct current/direct current converter 24 when a predetermined stop condition set in advance is satisfied during step-up operation or step-down operation of the direct current/direct current converter 24.

While the direct current/direct current converter 24 is stopped through intermittent step-up control, when the required driving force in motor running of the vehicle changes and the change becomes larger than or equal to a predetermined value A1, the controller 34 executes control so that the RrMG 32 outputs an excess of the change beyond the predetermined value A1 within the change in the required driving force. Thus, both a reduction in the loss of the direct current/direct current converter 24 and suppression of a decrease in driving performance are achieved. Hereinafter, this will be described in detail with reference to the flowcharts shown in FIG. 3A, FIG. 3B and FIG. 3C.

When the intermittent step-up/step-down control has been started, it is determined in step S20 in FIG. 3A whether the predetermined stop condition in intermittent step-up control is satisfied. Hereinafter, step S is simply referred to as S. The predetermined stop condition, for example, includes the condition that the detected value of the IL current sensor 54 is close to zero. The predetermined stop condition may include the condition that VH is stable. The state that "VH is stable" is that the target voltage VH* does not change for a predetermined time or longer or that it is determined that the detected voltage VH has converged to the target voltage VH*. In the latter meaning, for example, it may be determined on the basis of the fact that a state where the difference between the target voltage VH* and the detected voltage VH is smaller than or equal to a predetermined stopping value is kept for a predetermined time or longer, the fact that fluctuations in the detected voltage VH are smaller than or equal to a predetermined value over a predetermined time, or the like.

When affirmative determination is made in S20, the process proceeds to S21 in FIG. 3B. The controller 34 changes a switching operation stop flag from 0 to 1, and the controller 34 stops the switching operation of the direct current/direct current converter 24 in intermittent step-up control, that is, the controller 34 stops the direct current/direct current converter 24 (S21). At this time, the two switching elements Sa, Sb shown in FIG. 2 are turned off. When the voltage VH is higher than the voltage VL in this state, this circuit is assumed to be the same as a circuit in which the arrow B1-side region in FIG. 2 is separated from the arrow B2-side region. Therefore, when electric power is consumed on the FrMG 28 side with respect to the direct current/direct current converter 24, the electric charge of the high-voltage-side capacitor CH gradually decreases, and the voltage VH gradually decreases. In this case, when the difference between the detected voltage VH and the target voltage VH* becomes larger than or equal to a predetermined voltage difference ΔV set in advance, the stop of the switching operation, that is, the stop of the direct current/direct current converter 24, is cancelled. When the stop of the direct current/direct current converter 24 is cancelled, the direct current/direct current converter 24 returns to ordinary step-up operation, and a switching loss arises. Therefore, it is desired to extend a stop time of the direct current/direct current converter 24 in terms of a reduction in the loss of the direct current/direct current converter 24. In the present embodiment, by causing the RrMG 32 to output a torque corresponding to the change in the required driving force of the vehicle in response to fulfillment of the predetermined condition, an increase in the torque of the FrMG 28 is suppressed by suppressing an increase in the driving force of the FrMG 28. Thus, an increase in the difference between the detected voltage VH and the target voltage VH* in a short period of time is suppressed.

Figure 3C:
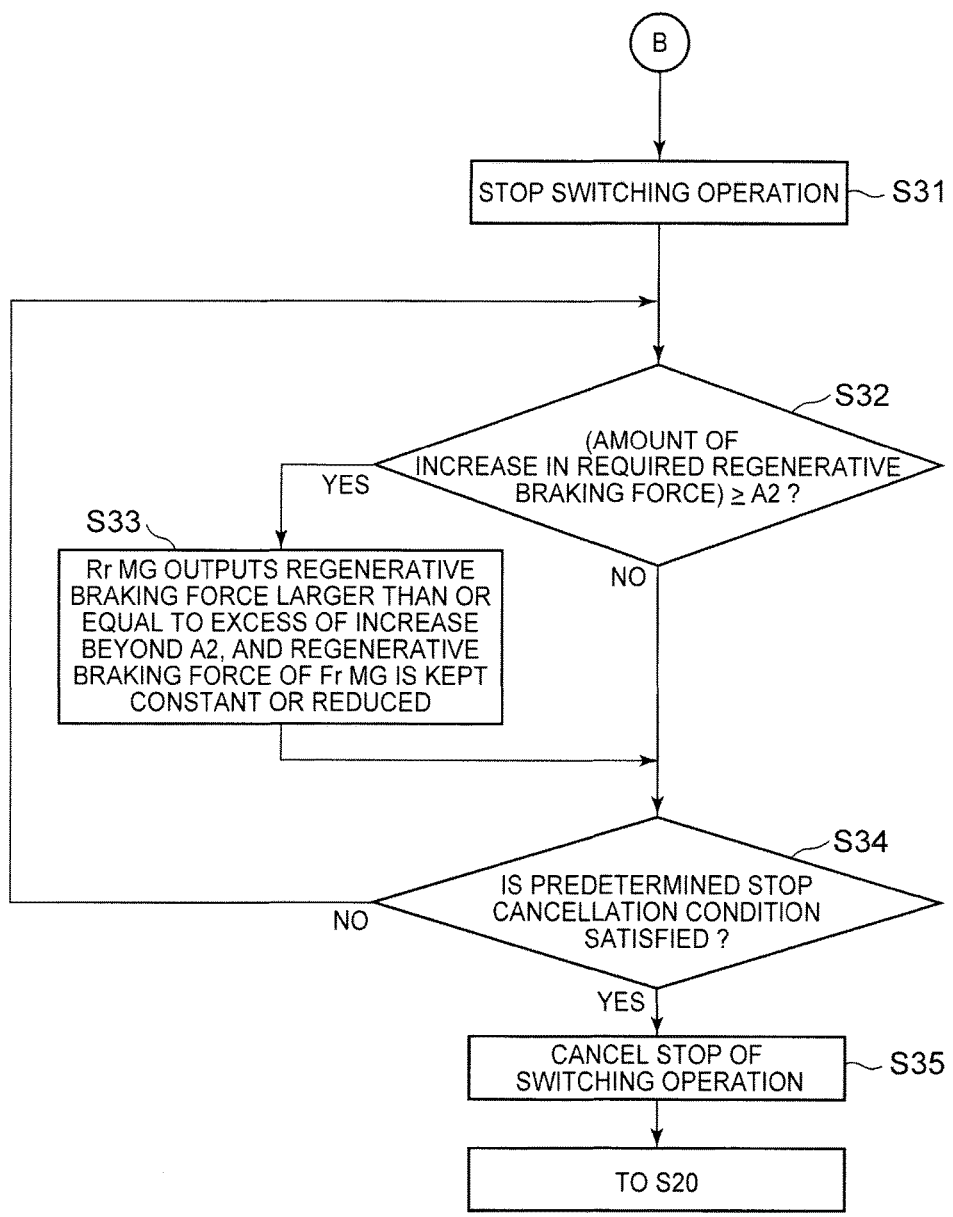
FIG. 3C is a view that shows a flowchart that is used in a process at the time of shifting into a stop of switching operation resulting from intermittent step-down operation in the flowchart shown in FIG. 3A.

Specifically, it is determined in S22 in FIG. 3B whether the amount of increase that is a change in the required driving force in motor running of the vehicle is larger than or equal to the predetermined value A1 set in advance. When affirmative determination is made in S22, this is the case where the required driving force changes so that the amount of increase becomes larger than or equal to A1. Therefore, in S23, the controller 34 increases the torque of the RrMG 32 so that the RrMG 32 outputs a driving force larger than or equal to an excess of the increase beyond A1, and keeps the driving force of the FrMG 28 constant or reduces the driving force of the FrMG 28. The increase in the driving force of the RrMG 32 may be larger than or equal to a value obtained by subtracting the predetermined value A1 from the amount of increase in the required driving force. Thus, the controller 34 achieves the required driving force with the use of the FrMG 28 and the RrMG 32. In this case, whether the driving force of the FrMG 28 is kept constant or reduced is set in advance. Whether the driving force of the FrMG 28 is kept constant or reduced may be changed in response to fulfillment of a predetermined condition set in advance. When the driving force of the FrMG 28 is reduced and the driving force of the RrMG 32 is increased in S23, the driving force of the FrMG 28 and the driving force of the RrMG 32 may be changed in set predetermined changes until each driving force reaches a corresponding one of predetermined driving forces of the FrMG 28 and RrMG 32 in the process that returns from S24 (described later) to S22, S23. This also applies to a change in the regenerative braking force in S33 in FIG. 3C (described later).

The condition for shifting into a stop of the switching operation of the direct current/direct current converter 24 is not limited to the condition that the load of the direct current/direct current converter 24 becomes an extremely small load state or a no-load state. For example, the "predetermined stop condition" for starting a stop of the switching operation does not need to include the condition that the detected value of the IL current sensor 54 is close to zero.

Figure 4:
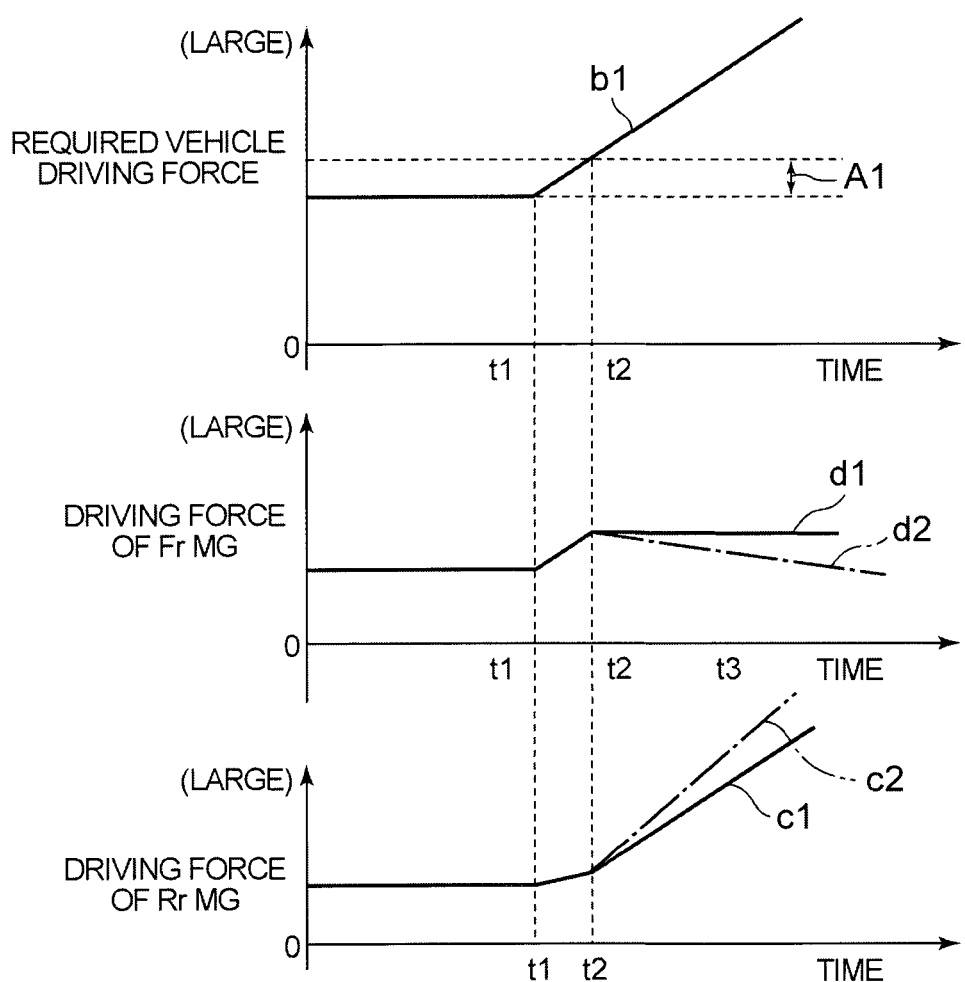
FIG. 4 is a graph that shows two examples of temporal changes in a required driving force of the vehicle, a driving force of an FrMG that is the first motor and a driving force of an RrMG that is the second motor during a stop of switching operation resulting from intermittent step-up control in the first embodiment of the invention.

FIG. 4 shows two examples of temporal changes in the required driving force of the vehicle, the driving force of the FrMG 28 and the driving force of the RrMG 32 during a stop of the switching operation resulting from intermittent step-up control in the present embodiment. The required vehicle driving force indicated by the continuous line b1 is kept constant during a period from the stop of the switching operation to time t1; however, for example, from time t1, the vehicle shifts from flat road running to uphill running, and the required vehicle driving force is rapidly increasing. FIG. 4 shows the driving force of the FrMG 28 by the continuous line d1, and shows the driving force of the RrMG 32 by the continuous line c1. From time t1 to time t2, the driving force is distributed between the FrMG 28 and the RrMG 32 at an ordinary distribution ratio, and the torque is output accordingly. On the other hand, when the amount of increase in the required vehicle driving force reaches A1 at time t2, an excess of the increase in the driving force beyond A1 is compensated by an increase in the driving force of the RrMG 32, the rate of increase in the driving force of the RrMG 32 increases as indicated by the continuous line c1, and the driving force of the FrMG 28 is kept constant as indicated by the continuous line d1. In this case, the rate of increase in the driving force of the RrMG 32 may be further increased as indicated by the alternate long and short dashed line c2, while the driving force of the FrMG 28 may be reduced as indicated by the alternate long and short dashed line d2. In this case, the driving force of the FrMG 28 may be adjusted so that a decrease in the driving force of the FrMG 28 becomes gentle, or a lower limit may be set for a decrease in the driving force of the FrMG 28.

Referring back to FIG. 3B, when negative determination is made in S22 or after the process of S23 is executed, it is determined in S24 whether a predetermined stop cancellation condition for cancelling the stop of the switching operation is satisfied. The predetermined stop cancellation condition is satisfied when the difference between the detected voltage VH and the target voltage VH* becomes larger than or equal to the predetermined voltage difference ΔV set in advance. In this case, when the predetermined stop condition for starting a stop of the switching operation includes the condition that the difference between the detected voltage VH and the target voltage VH* is smaller than or equal to the predetermined stopping value, the predetermined voltage difference ΔV may be set so as to be larger than the predetermined stopping value. The predetermined voltage difference ΔV may be changed in accordance with a correlation set in advance in response to fluctuations in the target voltage VH*.

When affirmative determination is made in S24, the controller 34 changes the switching operation stop flag from 1 to 0, and cancels the stop of the switching operation in S25. In this case, the direct current/direct current converter 24 returns to ordinary step-up operation, and the process returns to S20 in FIG. 3A. When negative determination is made in S24, the process returns to S22, and repeats the above-described routine.

On the other hand, when the process returns to FIG. 3A and negative determination is made in S20, it is determined whether a predetermined stop condition in intermittent step-down operation is satisfied (S30). The predetermined stop condition is the same as the predetermined stop condition in intermittent step-up control in S20 except that the predetermined stop condition is used in intermittent step-down control.

When affirmative determination is made in S30, the controller 34 changes the switching operation stop flag from 0 to 1, and stops the switching operation of the direct current/direct current converter 24 in intermittent step-down control in S31 in FIG. 3C. When negative determination is made in S30, it is determined in S40 whether a predetermined intermittent step-up/step-down control cancellation condition is satisfied. When negative determination is made in S40, the process returns to S20; whereas, when affirmative determination is made in S40, the intermittent step-up/step-down control process is ended. When the switching operation is stopped in S31, the controller 34, during the stop of the switching operation, controls the RrMG 32 so that the RrMG 32 outputs an excess of the regenerative braking force beyond a second predetermined value A2 within the increase in the required regenerative braking force when the amount of increase that is a change in the required regenerative braking force of the vehicle is larger than or equal to the second predetermined value A2 set in advance.

Specifically, in S32 in FIG. 3C, the controller 34 determines whether the amount of increase in the required regenerative braking force of the vehicle is larger than or equal to the second predetermined value A2. When affirmative determination is made in S32, the required regenerative braking force changes so that the amount of increase becomes larger than or equal to A2. In S33, the controller 34 increases the absolute value of the negative torque of the RrMG 32 so that the RrMG 32 outputs the regenerative braking force larger than or equal to an excess of the increase beyond A2, and the regenerative braking force of the FrMG 28 is kept constant or reduced. The increase in the regenerative braking force of the RrMG 32 may be larger than or equal to a value obtained by subtracting the second predetermined value A2 from the amount of increase in the required regenerative braking force. Thus, the controller 34 achieves the required regenerative braking force with the use of the FrMG 28 and the RrMG 32. In this case, whether the regenerative braking force of the FrMG 28 is kept constant or reduced is set in advance. Whether the regenerative braking force of the FrMG 28 is kept constant or reduced may be changed in response to fulfillment of a predetermined condition set in advance.

Figure 5:
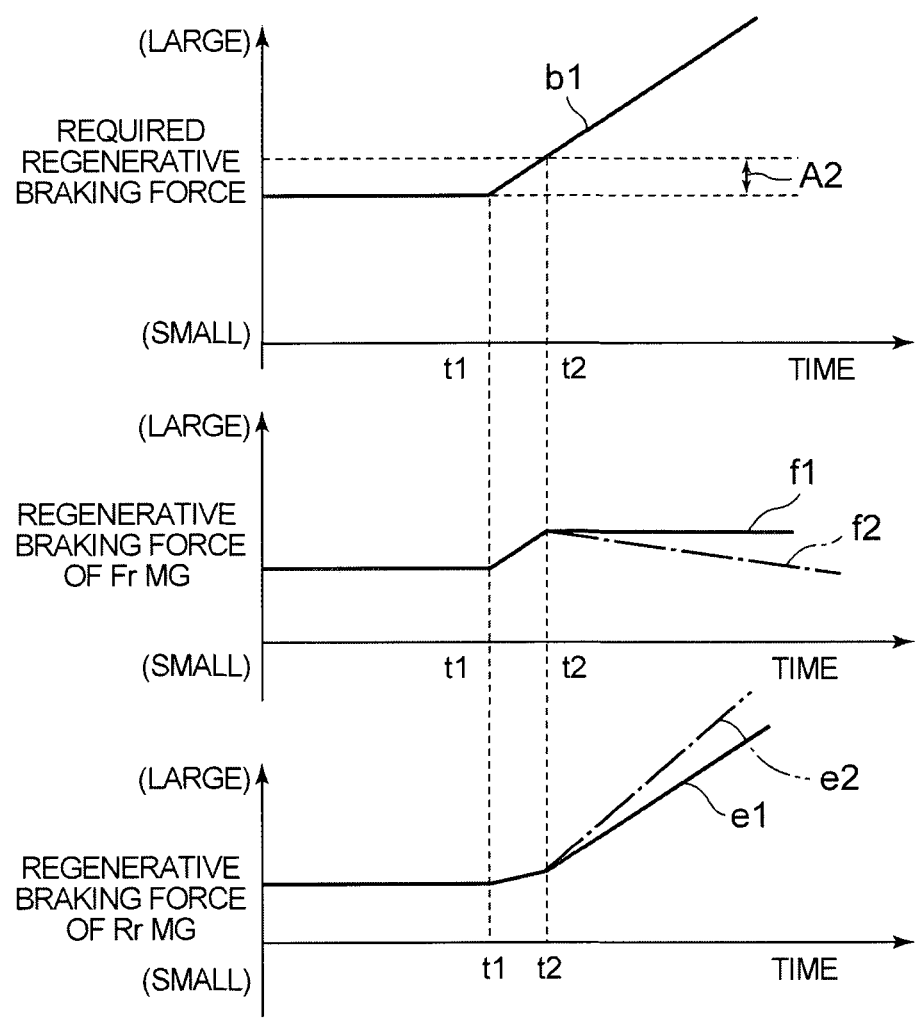
FIG. 5 is a graph that shows two examples of temporal changes in a required regenerative braking force, a regenerative braking force of the FrMG and a regenerative braking force of the RrMG during a stop of switching operation resulting from intermittent step-down control in the first embodiment of the invention.

FIG. 5 shows two examples of temporal changes in the required regenerative braking force, the regenerative braking force of the FrMG 28 and the regenerative braking force of the RrMG 32 during a stop of the switching operation resulting from intermittent step-down control in the present embodiment. The required regenerative braking force is kept constant during a period from the stop of the switching operation to time t1; however, for example, from time t2, the vehicle shifts from flat road running to downhill running, and the required regenerative braking force is rapidly increasing. From time t1 to time t2, the regenerative braking force is distributed between the FrMG 28 and the RrMG 32 at an ordinary distribution ratio. On the other hand, when the amount of increase in the required regenerative braking force reaches A2 at time t2, an excess of the increase in the regenerative braking force beyond A2 is compensated by an increase in the regenerative braking force of the RrMG 32, the rate of increase in the regenerative braking force of the RrMG 32 increases as indicated by the continuous line e1, and the regenerative braking force of the FrMG 28 is kept constant as indicated by the continuous line f1. In this case, the rate of increase in the regenerative braking force of the RrMG 32 may be further increased as indicated by the alternate long and short dashed line e2, while the regenerative braking force of the FrMG 28 may be reduced as indicated by the alternate long and short dashed line f2. In this case, the regenerative braking force of the FrMG 28 may be adjusted so that a decrease in the regenerative braking force of the FrMG 28 becomes gentle, or a lower limit may be set for a decrease in the torque of the FrMG 28.

Referring back to FIG. 3C, when negative determination is made in S32 or after the process of S33 is executed, it is determined in S34 whether a predetermined stop cancellation condition for cancelling the stop of the switching operation is satisfied. The predetermined stop cancellation condition is the same as the predetermined stop cancellation condition in intermittent step-up control described in S24 in FIG. 3B except that the predetermined stop cancellation condition is used in intermittent step-down control.

When affirmative determination is made in S34, the stop of the switching operation is cancelled in S35. In this case, the direct current/direct current converter 24 returns to ordinary step-down operation, and the process returns to S20 in FIG. 3A. When negative determination is made in S34, the process returns to S32, and repeats the above-described routine.

With the above configuration, even when the required driving force or the required regenerative braking force increases in the case where the direct current/direct current converter 24 is stopped in each of intermittent step-up control and intermittent step-down control, it is possible to suppress a rapid increase in the driving force or regenerative braking force of the FrMG 28 by changing the driving force or regenerative braking force of the RrMG 32. Therefore, it is possible to suppress an increase in the difference between the voltage VH and the target voltage VH* in a short period of time for the direct current/direct current converter 24, so it is possible to extend the stop time of the direct current/direct current converter 24, with the result that the loss of the switching operation of the direct current/direct current converter 24 is reduced. The required driving force or required regenerative braking force of the vehicle is achieved without being limited by the FrMG 28. As a result, both a reduction in the loss of the direct current/direct current converter 24 and suppression of a decrease in driving performance are achieved.

Figure 6:
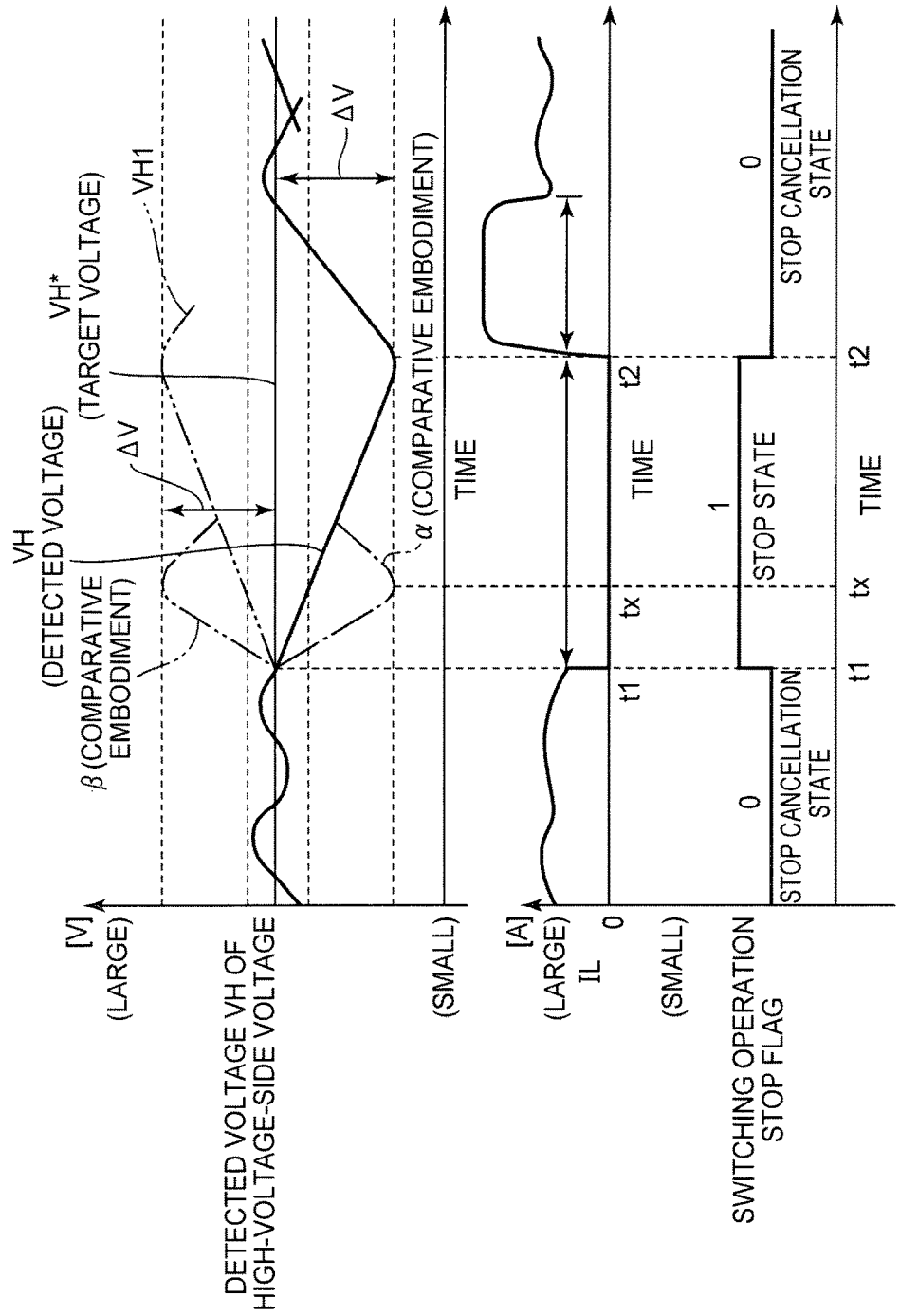
FIG. 6 is a graph that shows one example of temporal changes in a detected voltage VH of a high-voltage-side voltage, a reactor current IL and a switching operation stop flag in the first embodiment of the invention.

FIG. 6 shows one example of temporal changes in the detected voltage VH of the high-voltage-side voltage, the reactor current IL and the switching operation stop flag in the present embodiment. In FIG. 6, at time t1, the switching operation stop flag shifts from a switching operation stop cancellation state to a switching operation stop state. Thus, the detected voltage VH gradually decreases in the FrMG 28, and the difference from the target voltage VH* increases. In this case, the reactor current IL is kept at substantially zero. At time t2, the difference between the target voltage VH* and the detected voltage VH reaches the predetermined voltage difference ΔV, and the stop of the switching operation is cancelled. In this case, because ordinary step-up operation is carried out after time t2, the voltage VH gets close to the target voltage VH*. In the present embodiment, because the driving force of the RrMG 32 is increased in the case where the required driving force increases, it is possible to extend the switching operation stop time from time t1 to time t2, that is, the stop time of the direct current/direct current converter 24.

On the other hand, FIG. 6 shows a comparative embodiment by the alternate long and short dashed line α. The comparative embodiment differs from the present embodiment in that, during the stop of the switching operation, when the required driving force increases, the driving force of the FrMG 28 is not kept constant or reduced or the RrMG 32 is not caused to output a torque corresponding to an excess of the change in the driving force beyond the predetermined value. In this case, in the comparative embodiment, an electric power consumption on the FrMG 28 side with respect to the direct current/direct current converter 24 increases, the voltage VH significantly deviates from the target voltage VH* in a short period of time as indicated by the alternate long and short dashed line α, and, at time tx, the difference between the voltage VH and the target voltage VH* reaches the predetermined voltage difference ΔV in a short period of time, and the stop of the switching operation is cancelled. Therefore, the switching operation stop time is short, with the result that the switching loss increases. The present embodiment is able to prevent such an inconvenience.

The case where the switching operation is stopped in intermittent step-up control is described above with reference to FIG. 6. Next, the stop of the switching operation in intermittent step-down control will be described. In this case, the amount of electric power generated by the FrMG 28 increases when the regenerative braking force of the FrMG 28 rapidly increases. Therefore, as shown in a comparative embodiment indicated by the alternate long and two-short dashed line β, the detected voltage VH rapidly increases and significantly deviates from the target voltage VH*, the difference between the detected voltage VH and the target voltage VH* reaches the predetermined voltage difference ΔV in a short period of time, and the stop of the switching operation is cancelled. In the present embodiment, during the stop of the switching operation, the RrMG 32 is caused to output an excess of the regenerative braking force beyond the second predetermined value A2 within the amount of increase in the required regenerative braking force, and the regenerative braking force of the FrMG 28 is kept constant or reduced. Therefore, it is possible to extend the switching operation stop time by providing a gentle change as indicated by the alternate long and two-short dashed line VH1 through suppressing a rapid increase in the amount of electric power generated on the FrMG 28 side with respect to the direct current/direct current converter 24. Thus, the loss of the direct current/direct current converter 24 is reduced, and a decrease in driving performance is suppressed.

Figure 7:
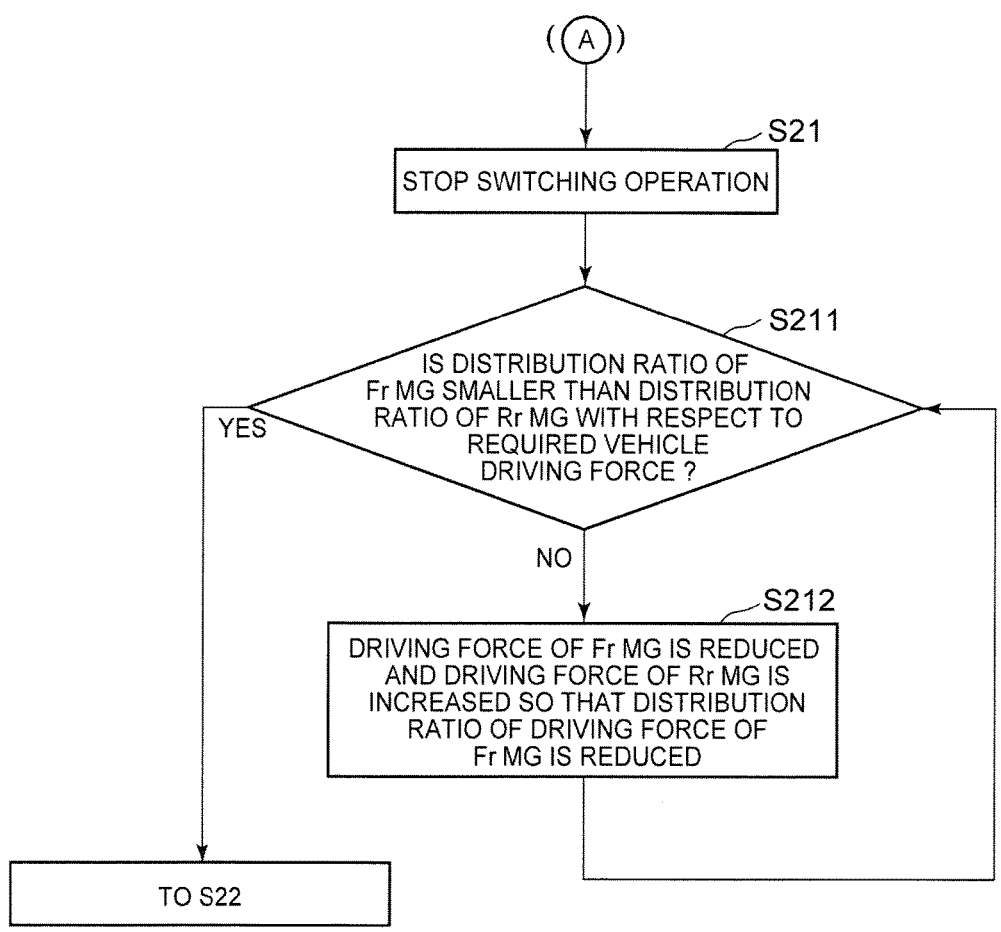
FIG. 7 is a view that shows a flowchart that is used in an additional process of control according to an alternative embodiment to the flowchart shown in FIG. 3B.

FIG. 7 shows a flowchart according to an alternative embodiment to the flowchart shown in FIG. 3B, and shows a flowchart in the case where an additional process is executed in intermittent step-up control. The flowchart of FIG. 7 is a process that is executed instead of the process of a portion indicated by the dashed-line box y in FIG. 3B. In this control, the predetermined stop condition is satisfied during intermittent step-up control in S20 in FIG. 3A, and the processes of S211, S212 are added after the switching operation is stopped in S21 and before proceeding to S22 in FIG. 3B. In S211, it is determined whether the distribution ratio of the FrMG 28 is smaller than the distribution ratio of the RrMG 32 with respect to the overall amount of the required vehicle driving force. When affirmative determination is made in S211, the process directly proceeds to S22. On the other hand, when negative determination is made in S211, the driving force of the FrMG 28 is reduced and the driving force of the RrMG 32 is increased so that the distribution ratio of the driving force of the FrMG 28 is reduced in S212. The process returns to S211, and repeats the above-described routine. In S212, the change in the driving force of the each of the FrMG 28 and the RrMG 32 is set, and each driving force is changed in accordance with the set change. Thus, the controller 34 executes control so that the distribution ratio of the driving force of the FrMG 28 becomes smaller than the distribution ratio of the driving force of the RrMG 32 with respect to the required driving force of the vehicle.

With the above configuration, the change in the driving force of the FrMG 28 with respect to the change in the required driving force of the vehicle during the stop of the switching operation is smaller than that when the processes of S211, S212 are not executed, so the voltage VH becomes more difficult to decrease. Therefore, it is possible to further suppress the switching loss by extending the switching operation stop time.

Figure 8A:
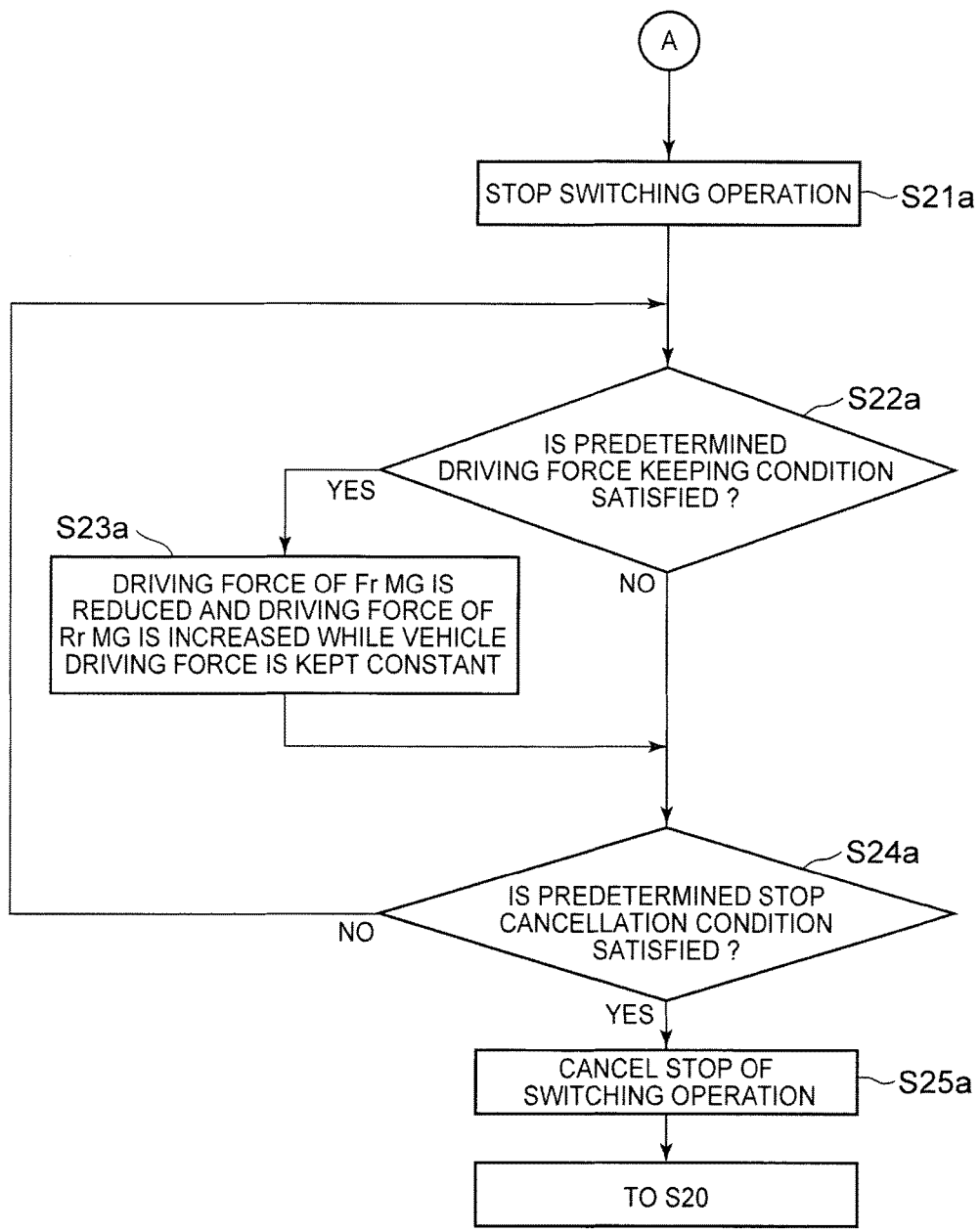
FIG. 8A is a view that shows a flowchart that is used in a process at the time of shifting into a stop of switching operation resulting from intermittent step-up control in a second embodiment of the invention.
Figure 8B:
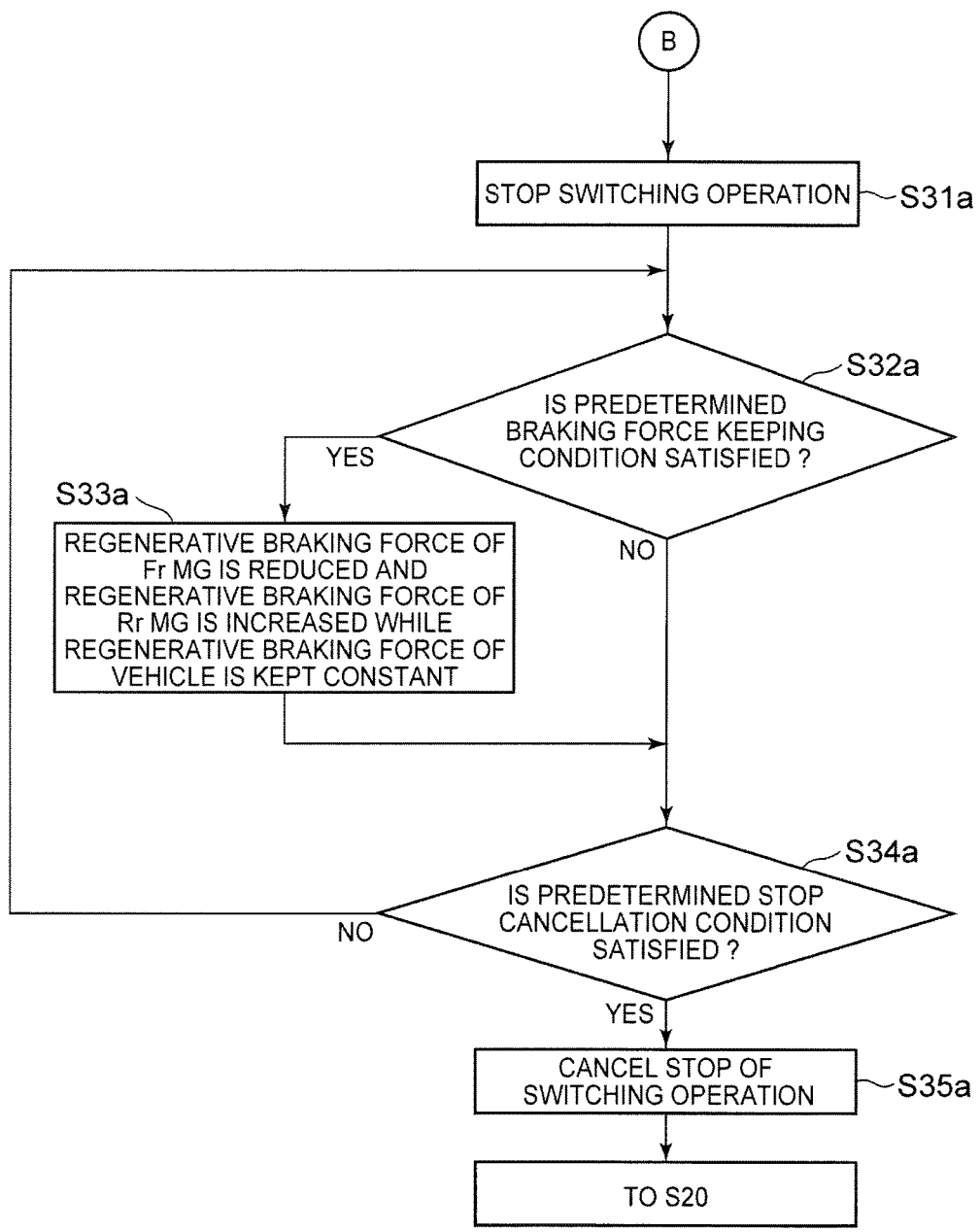
FIG. 8B is a view that shows a flowchart that is used in a process at the time of shifting into a stop of switching operation resulting from intermittent step-down operation in the second embodiment of the invention.

Next, a second embodiment of the invention will be described. FIG. 8A shows a flowchart that is used in a process at the time of shifting into a stop of switching operation resulting from intermittent step-up control in the second embodiment. FIG. 8B shows a flowchart that is used in a process at the time of shifting into a stop of the switching operation resulting from intermittent step-down control in the second embodiment. In the second embodiment, the configuration of the electromotive vehicle 10 is similar to the configuration shown in FIG. 1 and FIG. 2. In the present embodiment, the process at the time of shifting into a stop of the switching operation resulting from each of intermittent step-up control and intermittent step-down control is similar to the case shown in FIG. 3A. During the stop of the switching operation resulting from intermittent step-up control, when a predetermined driving force keeping condition set in advance is satisfied in motor running, the controller 34 controls the torque of each of the MGs 28, 32 so that the driving force of the FrMG 28 is reduced and the driving force of the RrMG 32 is increased while the driving force of the vehicle is kept constant.

Specifically, when affirmative determination is made in S20 in FIG. 3A, the switching operation is stopped in S21a in FIG. 8A as in the case of S21 in FIG. 3A, and the controller 34 determines in S22a whether the predetermined driving force keeping condition is satisfied. For example, when a change in the required driving force of the vehicle over a predetermined time falls within the range of a predetermined value, it is determined that the change in the required driving force is small, and the predetermined driving force keeping condition is satisfied; otherwise, the predetermined driving force keeping condition is not satisfied. The predetermined driving force keeping condition may be simply configured to be satisfied when a predetermined stop condition for stopping the switching operation is satisfied.

When affirmative determination is made in S22a, the process proceeds to S23a. In S23a, the driving force of the FrMG 28 is reduced and the driving force of the RrMG 32 is increased while the driving force of the vehicle is kept constant so as to coincide with the required driving force set at the timing of affirmative determination in S22a. In this case, in the process that returns from S24a (described later) to S22a, S23a, the torque of each of the MGs 28, 32 may be changed so that the distribution ratio of the driving force of the RrMG 32 gradually changes by predetermined percentages. When the driving force of the FrMG 28 and the driving force of the RrMG 32 have a predetermined correlation in S23a, the driving force of the FrMG 28 and the driving force of the RrMG 32 are kept constant. After S23a or when negative determination is made in S22a, it is determined in S24a whether the predetermined stop cancellation condition is satisfied. When affirmative determination is made in S24a, the stop of the switching operation is cancelled, the direct current/direct current converter 24 returns to ordinary step-up operation, and the process returns to S20 (S25a). When negative determination is made in S24a, the process returns to S22a, and repeats the above-described routine.

On the other hand, when the predetermined driving force keeping condition is satisfied during the stop of the switching operation resulting from intermittent step-down control, the controller 34 executes control so that the regenerative braking force of the FrMG 28 is reduced and the regenerative braking force of the RrMG 32 is increased while the regenerative braking force is kept constant.

Specifically, when affirmative determination is made in S30 in FIG. 3A, the switching operation is stopped in S31a in FIG. 8B as in the case of S31, the controller 34 determines in S32a whether the predetermined driving force keeping condition is satisfied. The predetermined driving force keeping condition is the same as the condition described in S22a in FIG. 8A.

When affirmative determination is made in S32a, the process proceeds to S33a. In S33a, the regenerative braking force of the FrMG 28 is reduced and the regenerative braking force of the RrMG 32 is increased while the regenerative braking force of the vehicle is kept constant so as to coincide with the regenerative braking force set at the timing of affirmative determination in S32a. In this case, as in the case of changing the driving forces in S23a, the regenerative braking force of the FrMG 28 and the regenerative braking force of the RrMG 32 may be gradually changed. The processes of S34a, S35a are similar to the processes of S24a, S25a in FIG. 8A. When negative determination is made in S34a, the process returns to S32a, and repeats the above-described routine.

FIG. 9 shows one example of temporal changes in the required driving force of the vehicle, the driving force of the FrMG 28 and the driving force of the RrMG 32 during a stop of the switching operation resulting from intermittent step-up control in the present embodiment. When the required vehicle driving force is kept constant from time t1 to time t2, the controller 34 determines that the predetermined driving force keeping condition is satisfied. From time t2, the controller 34 reduces the driving force of the FrMG 28 and increases the driving force of the RrMG 32 while keeping the vehicle driving force constant. At time t3, it is determined that the driving force of the FrMG 28 is smaller than the driving force of the RrMG 32. From time t3, the driving force of the FrMG 28 and the driving force of the RrMG 32 are kept constant. From time t3, the driving force of the FrMG 28 may be gently reduced to zero as in the case from time t2 to time t3, and the driving force of the RrMG 32 may be gently increased in association with the driving force of the FrMG 28. Although a graph that shows temporal changes in the required regenerative braking force, the regenerative braking force of the FrMG 28 and the regenerative braking force of the RrMG 32 during a stop of the switching operation resulting from intermittent step-down control is omitted, this graph is similar to the graph of FIG. 9 except that the required driving force is replaced with the required regenerative braking force and the driving force is replaced with the regenerative braking force.

With the above configuration, when the direct current/direct current converter 24 is stopped in each of intermittent step-up control and intermittent step-down control, it is possible to reduce the driving force or regenerative braking force of the FrMG 28 with a change in the driving force or regenerative braking force of the RrMG 32 while the required driving force or the required regenerative braking force is kept constant. Therefore, it is possible to extend the stop time of the direct current/direct current converter 24 by suppressing an electric power consumption on the FrMG 28 side with respect to the direct current/direct current converter 24. The decrease in the driving force of the FrMG 28 is compensated by an increase in the driving force of the RrMG 32. As a result, both a reduction in the loss of the direct current/direct current converter 24 and suppression of a decrease in driving performance are achieved. The remaining configuration and operation are similar to those of the above-described configuration shown in FIG. 1 to FIG. 6.

Any one example of the above-described first embodiment and the second embodiment may be implemented in combination. For example, when the required driving force or required regenerative braking force of the vehicle is kept within a predetermined range, the controller 34, as in the case of the second embodiment, may execute control so that the driving force or regenerative braking force of the FrMG 28 is increased and the driving force or regenerative braking force of the RrMG 32 is reduced while the driving force of the vehicle is kept constant. In this case, when the required driving force exceeds the predetermined range, the controller 34 may execute control so that the driving force or regenerative braking force of the RrMG 32 is increased in response to fulfillment of a predetermined condition and the driving force or regenerative braking force of the FrMG 28 is kept constant or reduced.

In the above-described first embodiment, when the amount of increase in the required driving force or required regenerative braking force during the stop of the direct current/direct current converter 24 is larger than or equal to the predetermined value or the second predetermined value, the RrMG 32 is caused to output a driving force or a regenerative braking force in correspondence with an excess of the increase beyond the predetermined value or the second predetermined value. On the other hand, the controller 34 may be configured not to set the predetermined value or the second predetermined value, and may execute control so that, when there is a change, for example, an increase, in required driving force or required regenerative braking force from the timing of a stop of the direct current/direct current converter 24 during the stop, the RrMG 32 is caused to output the entire change, for example, the entire increase, from the timing of the stop.

When a decrease in required driving force or required regenerative braking force during the stop of the direct current/direct current converter 24 is larger than or equal to the predetermined value or the second predetermined value, the controller 34 may cause the RrMG 32 to output a driving force or a regenerative braking force in correspondence with an excess of the decrease beyond the predetermined value or the second predetermined value. In this case, the controller 34 reduces the driving force or regenerative braking force of the RrMG 32, and keeps the driving force or regenerative braking force of the FrMG 28 constant. For example, in each of the above-described embodiments, the electromotive vehicle 10 may be a hybrid vehicle in which a generator is connected to the high-voltage VH side of the direct current/direct current converter 24 via a power generation inverter and the generator is driven by an engine. In this case, the controller 34 may execute control so that electric power is supplied from the generator to the FrMG 28 where necessary. In such a hybrid vehicle, if the driving force or regenerative braking force of the FrMG 28 rapidly decreases during a stop of the direct current/direct current converter 24, control over the generator cannot be caused to follow the rapid decrease. Therefore, the voltage VH may increase and the difference between the detected voltage VH and the target voltage VH* may reach the predetermined voltage difference $\Delta V$ in a short period of time, with the result that the stop of the direct current/direct current converter 24 may be cancelled in a short period of time. By applying the invention to such a configuration, it is possible to reduce the switching loss in this case, and it is possible to suppress a decrease in driving performance. In this case, the generator may be a motor generator that is basically used as a generator.

In the above description, the RrMG 32 is connected to the battery 22 without intervention of the direct current/direct current converter. Instead, the RrMG 32 may be provided with another direct current/direct current converter different from the direct current/direct current converter 24 connected to the FrMG 28, and the direct current/direct current converter may be provided at the position indicated by the alternate long and short dashed line Q in FIG. 1. In this case, the RrMG 32 is connected to the battery 22 via this direct current/direct current converter. Alternatively, the first motor connected to the direct current/direct current converter 24 and the second motor connected to the battery 22 without intervention of the direct current/direct current converter 24 may be interchanged with each other as the motor used for driving the front wheels and the motor used for driving the rear wheels.

What is claimed is:
1. A drive control system for a vehicle, the drive control system comprising:
  a direct-current power supply;
  a direct current/direct current converter connected to the direct-current power supply, the direct current/direct current converter being configured to transform a voltage of the direct-current power supply;
  a first inverter;
  a second inverter;
  a first motor connected to the direct-current power supply via the direct current/direct current converter and the first inverter, the first motor being configured to drive one of front and rear wheels of the vehicle;
  a second motor connected to the direct-current power supply via the second inverter, the second motor being configured to drive the other one of the front and rear wheels, and the other one of the front and rear wheels being different from the wheel that the first motor drives; and
  a controller configured to
    (i) control step-up operation of the direct current/direct current converter through switching control over the direct current/direct current converter,
    (ii) execute intermittent step-up control for stopping the direct current/direct current converter in response to fulfillment of a predetermined stop condition during the step-up operation, and

(iii) when a required driving force of the vehicle changes during a stop of the direct current/direct current converter through the intermittent step-up control, cause the second motor to output the change in the required driving force.

2. The drive control system according to claim 1, wherein
each of the first motor and the second motor is configured to have a function of a generator,
the direct current/direct current converter is configured to step down a voltage on a side of the first inverter and then output an electric power having the stepped-down voltage to the direct-current power supply,
the controller is configured to control step-down operation of the direct current/direct current converter through switching control over the direct current/direct current converter,
the controller is configured to execute intermittent step-down control for stopping a switching operation of the direct current/direct current converter in response to fulfillment of the predetermined stop condition during the step-down operation, and
controller is configured to, when a required regenerative braking force of the vehicle changes during a stop of the direct current/direct current converter through the intermittent step-down control, cause the second motor to output the change in the required regenerative braking force.

3. The drive control system according to claim 2, wherein
when a change in the required diving force is larger than or equal to a first predetermined value or a change in the required regenerative braking force is larger than or equal to a second predetermined value during a stop of the direct current/direct current converter, the controller is configured to cause the second motor to output an excess of the change in the required driving force beyond the first predetermined value or an excess of the change in the required regenerative braking force beyond the second predetermined value.

4. The drive control system according to claim 3, wherein
when the change in the required diving force is larger than or equal to the first predetermined value or a change in the required regenerative braking force is larger than or equal to the second predetermined value during the stop of the direct current/direct current converter, the controller is configured to cause the second motor to output the excess of the change in the required driving force beyond the first predetermined value or the excess of the change in the required regenerative braking force beyond the second predetermined value, and
the controller is configured to reduce a driving force or regenerative braking force of the first motor.

5. The drive control system according to claim 1, wherein
the controller is configured to set a distribution ratio of a driving force of the first motor so as to be smaller than a distribution ratio of a driving force of the second motor with respect to the required driving force during the stop of the direct current/direct current converter.

6. A drive control system for a vehicle, the drive control system comprising:
a direct-current power supply;
a direct current/direct current converter connected to the direct-current power supply, the direct current/direct current converter being configured to transform a voltage of the direct-current power supply;
a first inverter;
a second inverter;
a first motor connected to the direct-current power supply via the direct current/direct current converter and the first inverter, the first motor being configured to drive one of front and rear wheels of the vehicle;
a second motor connected to the direct-current power supply via the second inverter, the second motor being configured to drive the other one of the front and rear wheels, and the other one of the front and rear wheels being different from the wheel that the first motor drives; and
a controller configured to
(i) control step-up operation of the direct current/direct current converter through switching control over the direct current/direct current converter,
(ii) execute intermittent step-up control for stopping the direct current/direct current converter in response to fulfillment of a predetermined stop condition during the step-up operation, and
(iii) during a stop of the direct current/direct current converter through the intermittent step-up control, reduce a driving force of the first motor and increase a driving force of the second motor while a driving force of the vehicle is kept constant.

7. The drive control system according to claim 6, wherein
each of the first motor and the second motor is configured to have a function of a generator,
the direct current/direct current converter is configured to step down a voltage on a side of the first inverter and then output an electric power having the stepped-down voltage to the direct-current power supply,
the controller is configured to control step-down operation of the direct current/direct current converter through switching control over the direct current/direct current converter,
the controller is configured to execute intermittent step-down control for stopping a switching operation of the direct current/direct current converter in response to fulfillment of the predetermined stop condition during the step-down operation, and
the controller is configured to, during a stop of the direct current/direct current converter through the intermittent step-down control, reduce a regenerative braking force of the first motor and increase a regenerative braking force of the second motor while a regenerative braking force of the vehicle is kept constant.

* * * * *